US007444402B2

(12) United States Patent
Rennels

(10) Patent No.: US 7,444,402 B2
(45) Date of Patent: Oct. 28, 2008

(54) OFFENSIVE MATERIAL CONTROL METHOD FOR DIGITAL TRANSMISSIONS

(75) Inventor: Ernest B. Rennels, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 838 days.

(21) Appl. No.: 10/386,348

(22) Filed: Mar. 11, 2003

(65) Prior Publication Data

US 2004/0205334 A1 Oct. 14, 2004

(51) Int. Cl.
*G06F 15/16* (2006.01)
*G06F 15/173* (2006.01)
*G06F 15/177* (2006.01)

(52) U.S. Cl. ......................... 709/224; 709/219; 725/28; 715/719

(58) Field of Classification Search ......... 709/200–203, 709/217–229, 231–232, 245, 246, 248, 249; 719/310, 318; 725/28; 348/473; 715/719
See application file for complete search history.

(56) References Cited

U.S. PATENT DOCUMENTS 5,708,476 A * 1/1998 Myhrvold et al. ............. 348/73
5,973,683 A * 10/1999 Cragun et al. ............... 715/719
6,510,458 B1 * 1/2003 Berstis et al. ............... 709/219
6,553,566 B1 * 4/2003 Grant et al. .................... 725/28
6,675,162 B1 * 1/2004 Russell-Falla et al. ......... 707/5
6,675,384 B1 * 1/2004 Block et al. .................... 725/28
6,912,571 B1 * 6/2005 Serena ........................ 709/224
2003/0013425 A1 * 1/2003 Nee ......................... 455/186.1
2004/0006767 A1 * 1/2004 Robson et al. ................ 725/28
2004/0010798 A1 * 1/2004 Galli et al. ..................... 725/28
2004/0049780 A1 * 3/2004 Gee ............................. 725/32
2005/0108227 A1 * 5/2005 Russell-Falla et al. ......... 707/5

OTHER PUBLICATIONS

Policy Based offensive content substitution through content modification proxy, Nov. 1998, Research Disclosure, IBM, p. 1.*
Policy Based offensive content substitution for world wide web -performing substitution at point between creator and user, Feb. 1999, IBM, p. 1.*

* cited by examiner

*Primary Examiner*—Haresh N Patel

(57) ABSTRACT

The present invention is a method and a system for screening offensive material in a digital transmission. A digital transmission including at least one embedded offensive material code associated with a portion of the digital transmission is received. The digital transmission is monitored for the offensive material code. The digital transmission is modified based on the embedded offensive material code and an offensive-material control input, and the modified digital transmission is played.

15 Claims, 4 Drawing Sheets

OFFENSIVE MATERIAL CONTROL METHOD FOR DIGITAL TRANSMISSIONS

FIELD OF THE INVENTION

This invention generally relates to screening of programmed material for offensive material. In particular, the invention relates to a method and system for screening and blocking offensive material in a digital transmission.

BACKGROUND OF THE INVENTION

In recent years, there has been increased interest of parents as well as others to filter out objectionable, obscene or pornographic materials from media, particularly Internet-related sources. Currently, a few software and Internet-service-provider products filter offensive content from Internet material through a combination of highly tailored filtering capability and recognition of a wide variety of questionable content on individual sites. Default Internet blocking may include sex, illegal activity/drugs, and hate/intolerance categories. Other filtering technologies may blank out objectionable words or block Internet content by keyword patterns in uniform resource locators (URLs) or Internet addresses.

While efforts have been made to develop technology for filtering out objectionable material from Internet media, there is little focus on technologies related to selective filtering of objectionable material from digital audio streams, such as those broadcast from digital radio stations and satellite radio broadcasts. Currently, there is little or no parental control functionality for selectively blocking specific obscene words and phrases from digital audio or video streams. Current blocking techniques focus on blocking an entire channel over which the audio or video is transmitted. For example, a music recording may have a few obscene words in its song lyrics, and any screening for objectionable material that is done typically blocks the entire channel on which the audio is played. The user only has the choice of listening to the uncensored version or none at all. The user is unable to limit or modify the playing of specific objectionable portions of a data stream. Currently, there exists no parental control functionality for selectively blocking specific obscene words and phrases from digital audio streams.

Techniques exist today for encoding additional data within a stream of broadcast or playable digital audio. For example, a digital radio station can broadcast additional encoded digital data within its audio stream that include information on the name and title of the song being played. Many digital radio receivers are able to extract that data from a digital broadcast and display the name and title on their front light-emitting display (LED) panels. These techniques are typically limited to name and title information, though contain no information regarding offensive content.

An improved method and system for screening offensive material in digital transmissions would allow a user, particularly a parent, more control over specific objectionable material broadcast or played from an audio or video medium. It is desirable, therefore, to provide a system and method that screen offensive material in various types of digital transmissions, and to overcome the challenges and obstacles described above.

SUMMARY OF THE INVENTION

The present invention is a system and method for screening offensive material in a digital transmission. A digital transmission including at least one embedded offensive material code associated with a portion of the digital transmission is received. The digital transmission is monitored for the offensive material code. The digital transmission is modified based on the embedded offensive material code and an offensive material control input, and the modified digital transmission is played.

An offensive material code may be embedded into a digital transmission. The digital transmission with the embedded offensive material code may be sent to a receiving unit. Another aspect of the invention includes a computer usable medium with a program to screen offensive material in a digital transmission.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

In one embodiment of the present invention, a portion of a digital transmission that contains potentially offensive material is marked to indicate the position of the offensive material. When the digital transmission with the offensive material is received, the transmission may be modified based on a user's preference as indicated by an offensive material control input. Portions of the transmission may then be blanked out, substituted with a pre-selected segment, or replaced with a non-offensive material segment. During the digital encoding of an audio or video stream, it is possible for particular obscene words, phrases, graphics and video segments to be specifically flagged and encoded into the material before transmission. Upon reception of the data stream at the receiving device such as a digital radio receiver, the receiving device then decodes the data to the original data stream for playback through an audio system. If the obscene material is specifically marked during the digital encoding of the audio or video, the receiving device can determine which portions of the data transmission contain obscene or potentially offensive language and be able to filter out or modify specific portions by the user turning on a parental control function, without affecting the rest of the audio stream. In this manner, a user would be able to turn off parental controls to hear the complete version of audio being played. Since a parental control can mute or modify the obscene portions of the audio or video when children are present, a parent better controls what a child may hear.

Figure 1:
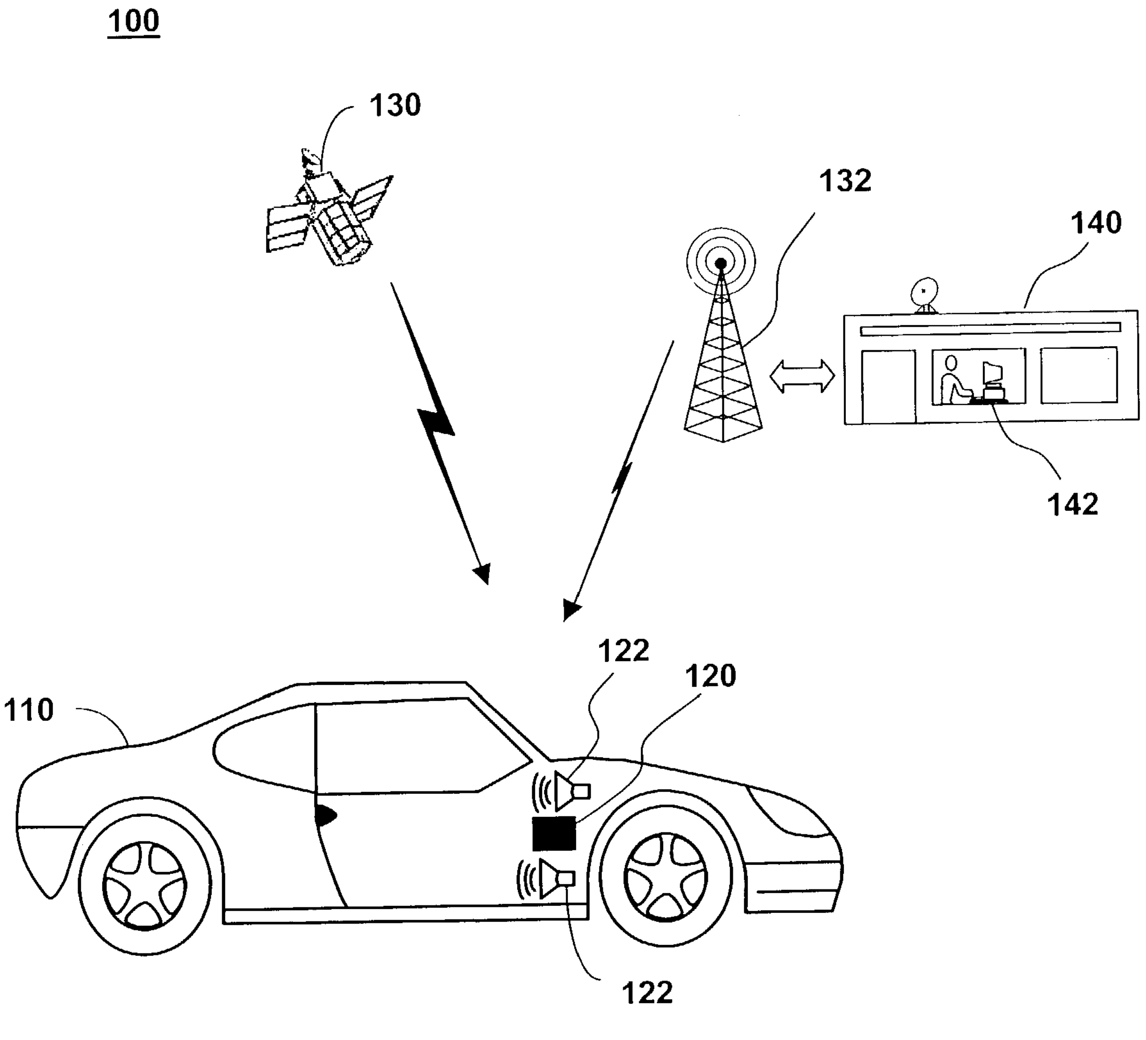
FIG. 1 is a schematic diagram of a system for screening offensive material in a digital transmission, in accordance with one embodiment of the current invention.

FIG. 1 shows a schematic diagram of one embodiment of a system for screening offensive material in a digital transmission, in accordance with the present invention at 100. Screening system 100 includes a receiving unit such as a radio 120 shown for illustrative purposes in a mobile vehicle 110, and a transmitting unit for a digital transmission such as a satellite-radio broadcast satellite 130 or a satellite-radio terrestrial antenna 132.

The digital transmission includes at least one embedded offensive material code associated with a portion of the digital transmission. The receiving unit receives and monitors the digital transmission for the offensive material code, and modifies the digital transmission based on the embedded offensive material code and an offensive material control input. The receiving unit may play the modified digital transmission, or forward the transmission to another unit for decoding and playing the modified digital transmission.

Radio 120 is any suitable radio for receiving digital broadcasts, such as a satellite radio receiver or a digital radio receiver. Radio 120 may be a portable unit, or mounted permanently in a mobile vehicle 110. Radio 120 contains suitable hardware and software for receiving a digital transmission and monitoring the transmissions for an offensive material code. When an offensive material code is received, radio 120 may modify the digital transmission based on an offensive-material control input such as a parental control setting. Radio 120 may then play the modified or unmodified transmission through speakers 122. Radio 120 contains soft or dedicated buttons, a keypad, a pull-down menu, a touch-screen, voice-recognition capability, or other input device so that the user preference for the offensive-material control input can be selected.

Radio 120 contains suitable hardware and software to run a program for screening offensive material in a digital transmission. The program may be stored internally in permanent or volatile memory, or on any suitable medium such as a CD, DVD, diskettes, or any other optical or magnetic media.

The digital transmission containing the offensive material code may be transmitted to the receiving unit, for example, by satellite radio broadcast satellite 130 or satellite radio terrestrial tower 132. Alternatively, the digital transmission may be sent by any suitable medium such as an Internet radio transmission, a digital radio transmission, a satellite television (TV) transmission, a compact disc (CD) output, a digital video disc (DVD) output, an MP3 (MPEG, audio layer 3) output, a digital audio transmission, a digital video transmission, or a digital device output.

The digital transmission may be received at a receiving unit such as a networked digital device, a digital radio receiver, a satellite TV receiver, a CD player, a DVD player, an MP3 player, a digital audio player, a digital video player, a digital entertainment system, or other types of digital device players.

In another embodiment of the present invention, an offensive material code is embedded into a digital transmission. Embedding the offensive material codes into the digital transmission may be done at a recording or broadcasting studio 140 using a computer 142 running any suitable computer program code for embedding the offensive material codes into the transmission. The codes may be placed into the transmission during programming or editing. The codes may indicate, for example, when the offensive material starts and how long the offensive material is, or when the offensive material starts and when the offensive material stops. The codes may be placed into the transmission during subsequent editing or during a subsequent review process. In another embodiment, substitute words or phrases may be inserted into the programming during initial or subsequent content development, such that a receiver can play the alternate material when the parental control setting is activated. Studio 140 may send the digital transmission with the embedded offensive material code to a receiving unit, using any suitable medium such as a satellite radio broadcast, the Internet, a digital radio transmission, a satellite television transmission, a CD, a DVD, an MP3 disc, or other types of digital audio or video transmissions.

Figure 2:
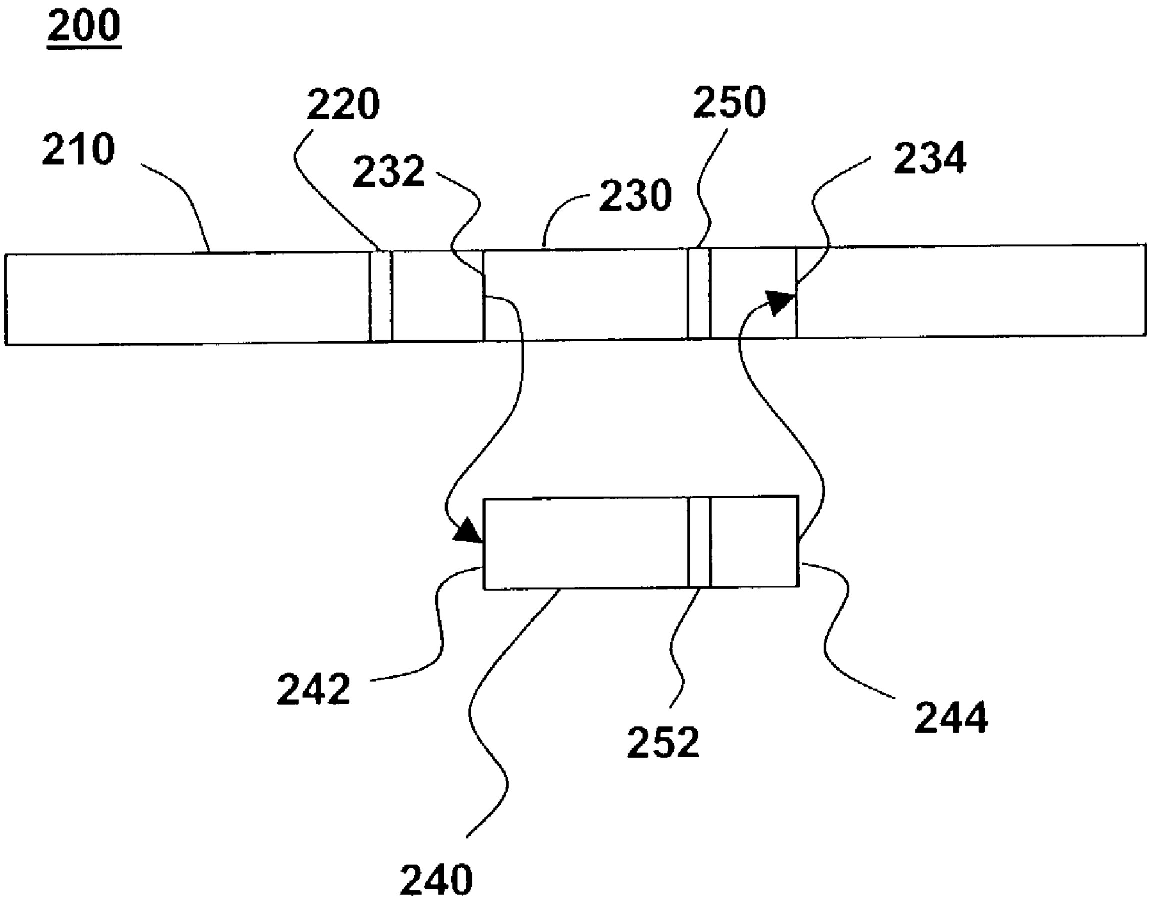
FIG. 2 is a schematic illustration of a digital transmission with an embedded offensive material code, in accordance with one embodiment of the current invention.

FIG. 2 shows a schematic illustration of one embodiment of a digital transmission with an embedded offensive material code, in accordance with the present invention at 200. Digital transmission 200 includes a sequence 210 of bits, words or packets with one or more embedded offensive material codes 220. Digital transmission 200 may comprise offensive portions and non-offensive portions, with the offensive portions marked by the embedded offensive material code 220.

Sequence 210 comprises a series of bits in a serial bit stream, a parallel bit stream, a set of packets, or other suitable digital configuration. Sequence 210 may be in an encoded or un-encoded format. Coded formats include various protocols such as voice-over-Internet protocol, real-time transport protocol for audio and video data, satellite radio protocol, CD protocol, DVD protocol, MP3 protocol, an MPEG protocol, and wireless communication protocols such as Bluetooth or 802.11. Included within sequence 210 is an embedded offensive material code 220. Embedded offensive material code 220 comprises a predetermined sequence of bits or an offensive material message indicating that a potentially offensive portion of the digital transmission is about to arrive. The offensive material code may comprise a predetermined code sequence, such as 16 bits all at a logical one, a set of ASCII characters such as two escape characters side by side, or any definable, unique set of bits that can be used to identify the offensive portion of the transmission. Alternatively, the offensive material code may comprise an offensive material message. The offensive material message may include, for example, a header and a body indicating the start of the offensive material and the length of the offensive material. The offensive material message may include, for example, a message indicating the start of the offensive material and a second message indicating the end of the offensive material. The offensive material message may indicate which portions of the transmission contain possibly offensive material. The offensive material message may indicate whether a substitute section is available when screening of the offensive material is desired. The offensive material message may be located near the start of the transmission or prior to the offensive portion. The offensive material message may include information on all locations of and any available alternate material for the offensive material.

In one embodiment, a non-offensive portion 240 may be transmitted along with an offensive portion 230. Offensive portion 230 and non-offensive portion 240 may be sent with an embedded offensive material code 220 indicating that an offensive portion of the transmission will be occurring, and allowing the receiver to determine which of the two segments should be played based on an offensive-material control input. The transmission can be played seamlessly, playing sequentially with no substitutions, replacements or blanking when the offensive-material control input indicates no screening. When the offensive-material control input indicates screening is desired, offensive portion 230 may be blanked, substituted for, or be replaced by non-offensive portion 240.

For example, offensive portion 230 may be indicated by embedded offensive material code 220. Offensive portion 230 is delineated in this example by offensive material start 232 and offensive material stop 234. Non-offensive portion 240 is delineated in this example by non-offensive material start 242 and non-offensive material stop 244. When offensive material start 232 is reached, either offensive portion 230 is played or non-offensive portion 240 is played based on the offensive-material control input. The offensive material codes may include a parameter indicating the severity of the offensive material, and one of several substitute segments may be inserted into the transmission, depending on the offensive-material control input.

In another embodiment, a second offensive material code 250 and 252 may be included in the digital transmission near the end of offensive portion 230 and non-offensive portion 240, respectively. The second code indicates that offensive portion 230 or non-offensive portion 240 will end immediately or at a prescribed time thereafter, so that a return to the main stream of digital transmission 200 can occur.

Non-offensive portion 240 may be provided as part of the digital transmission. Alternatively, non-offensive portion 240 may be a pre-selected insertion signal such as a tone, a sequence of tones, a stored audio stream, or a stored video stream. The tone or sequence of tones may be a bleep or other suitable sound made during the playing of offensive material when the material is being screened. A stored audio stream may be a stored waveform, a repeat of the previously played sounds, or a stretched, synthesized portion of the audio signals to cover over deleted material. The stored video stream may be a stored image such as a colored screen, a repeat of previously displayed video, or a digitally stretched portion of the video signals to cover over the deleted material.

Figure 3:
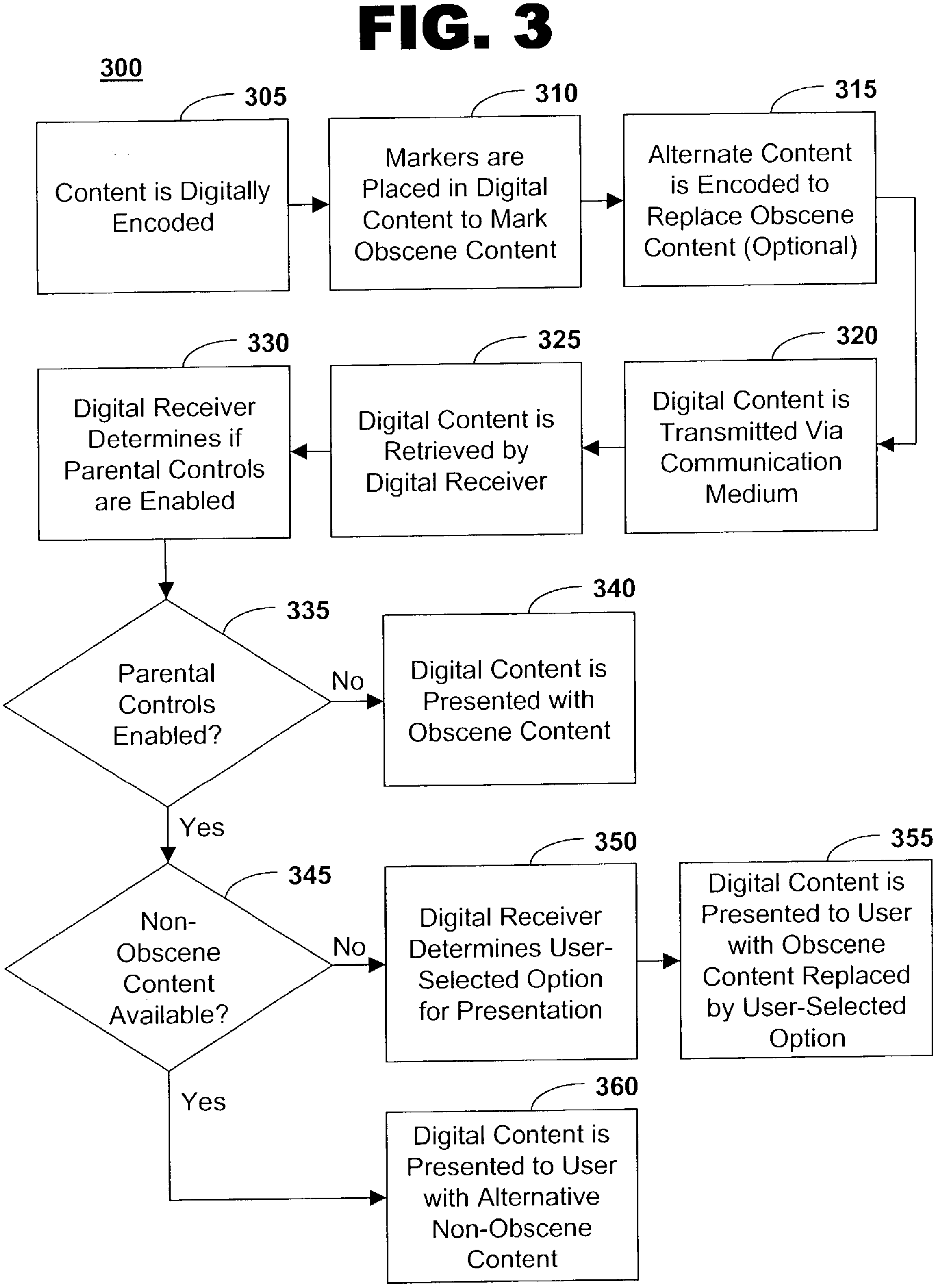
FIG. 3 is a flow diagram of a method to screen offensive material in a digital transmission, in accordance with one embodiment of the current invention.

FIG. 3 shows a flow diagram of one embodiment of a method for screening offensive material in a digital transmission, in accordance with the present invention at 300. Screening method 300 begins with digitally encoding audio or video content, as seen at block 305.

Encoded markers are placed in digital content to mark obscene content, as seen at block 310. Markers with digital codes indicating offensive material are embedded into the digital content or transmission. The offensive material code may include a predetermined code such as a specialized offensive material message. Optionally, alternate content may be encoded and included to replace obscene or offensive content, as seen at block 315.

The digital content is transmitted via a communication medium, as seen at block 320. Exemplary communication media that are used include a satellite radio broadcast from one of a broadcast satellite or a terrestrial antenna, an Internet radio transmission, a digital radio transmission, a satellite TV transmission, a CD output, a DVD output, an MP3 output, a digital audio transmission, and a digital video transmission. The digital transmission from these media is sent with the embedded offensive material code, and optionally with alternate content for the offensive material.

The digital content is retrieved by a digital receiver such as a digital radio receiver, a satellite TV receiver, a CD player, a DVD player, an MP3 player, a digital audio player, a digital video player, a digital entertainment system, a digital device player or any networked digital device, as seen at block 325. In an exemplary embodiment of the present invention, the digital transmission is received at a radio in a mobile vehicle.

The digital transmission may include one or more offensive material codes associated with a portion of the digital transmission. The digital receiver is designed to detect when one or more offensive material codes associated with a particular portion of the digital transmission is received, and to receive user input regarding how to handle the obscene or offensive material. The input of the user that is used to determine how offensive material is to be treated may be indicated by a button depression, a keypad input, a menu selection, a touch-screen selection, a voice-activated command, or any type of user preference input. For example, with menu selections of any of the above-mentioned input media, the user may decide to screen out the seven words that radio media traditionally avoid, sexually explicit material that the user finds offensive, or other user-determined offensive words.

The digital receiver, which monitors the digital transmission for the offensive material code, determines whether or not parental controls or other user inputs regarding offensive material content are enabled, as seen at block 330.

The parental controls or other user input regarding offensive material may or may not be enabled, as seen at block 335. When the controls on offensive material are not enabled, the digital content is presented with the digital content that has been marked as being potentially offensive or obscene, as seen at block 340. The digital content is played unaltered.

When the parental controls or other user inputs identifying offensive material are enabled, the digital receiver determines whether or not the digital content includes alternative non-obscene or offensive material in the digital content, as seen at block 345.

When the digital content does not include alternative non-obscene or non-offensive material, the digital receiver determines which user-selection option is to be used for screening out objectionable material from the digital presentation, as seen as block 350. For example, the user may have requested that computer program code within the radio modifies the digital transmission by blanking out a portion of the digital transmission where the offensive material code is located. Alternatively, the user-selected option may request that the radio substitute the objectionable content with a pre-defined insertion signal such as a tone, a sequence of tones, a stored audio stream, or a stored video stream The digital content is presented to the user with the obscene content replaced by the user-selected option, as seen at block 355. The computer program code within the radio modifies the digital transmission based on the embedded offensive material code and an offensive-material control input. The radio may modify the digital transmission by inserting a signal such as a tone, a sequence of tones, a stored audio stream, or a stored video stream into the place where the offensive material would be played.

When a user input regarding offensive material is enabled, and a computer program within the digital receiver determines that the digital content includes embedded code for alternative non-offensive material, the digital content is presented to user with the alternative non-objectionable content, as seen at block 360. As a result, the digital transmission that the digital receiver plays includes a non-offensive segment of data rather than the replaced offensive segment. For example, an obscene word may be replaced with an alternative, non-obscene word.

Figure 4:
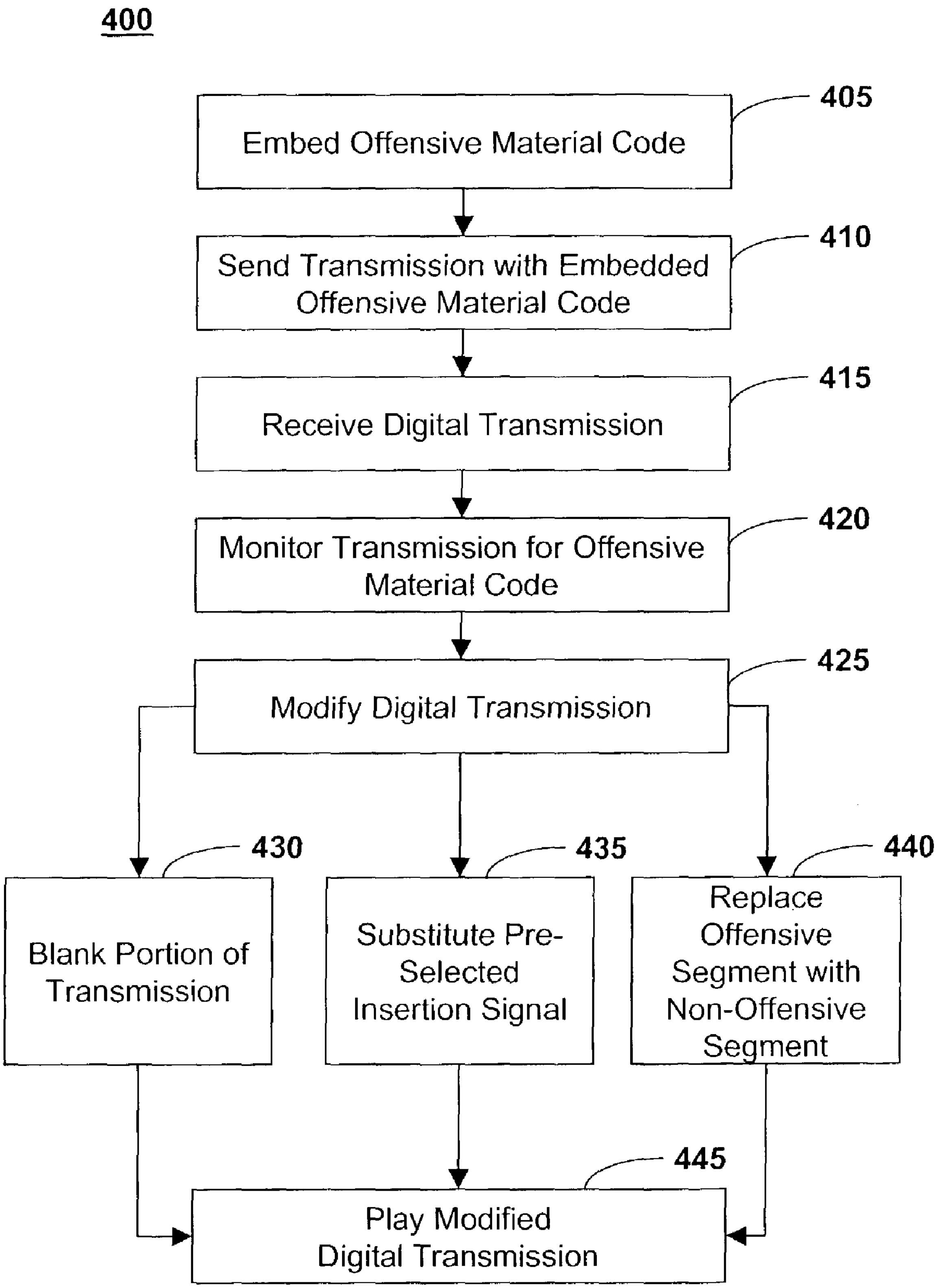
FIG. 4 is a flow diagram of a method to screen offensive material in a digital transmission, in accordance with another embodiment of the current invention.

FIG. 4 shows a flow diagram of another embodiment of a method to screen offensive material in a digital transmission, in accordance with the present invention at 400. Screening method 400 contains steps to screen offensive material in a digital transmission. Screening method 400 also contains steps to embed an offensive material code into the digital transmission.

An offensive material code is embedded into a digital transmission, as seen at block 405. The offensive material code may comprise, for example, a predetermined code sequence or an offensive material message. The offensive material code may be embedded into the digital stream when the programmed material is being prepared, or may be inserted at a later time, for example, during a review. The offensive material code may include a start code and duration. Alternatively, two offensive material codes may be inserted around the offensive segment, a start code and an end code. The digital transmission may additionally contain a substitute or replacement segment for play when the offensive material is disallowed.

The digital transmission with at least one embedded offensive material code associated with a portion of the digital transmission is sent, as seen at block 410. The digital transmission may comprise, for example, a satellite radio broadcast from a broadcast satellite or a terrestrial antenna. The digital transmission may comprise an Internet radio transmission, a digital radio transmission, or a satellite television transmission. The digital transmission may be extracted from a CD output, a DVD output, an MP3 output, or an output from any suitable semiconductor, magnetic or optical-memory device. The digital transmission may be a digital audio transmission, a digital video transmission, or a digital device output.

The digital transmission including at least one embedded offensive material code may be received at a receiving unit, as seen at block 415. The digital transmission may be received at a radio in a mobile vehicle. Other examples of receiving units include a networked digital device, a digital radio receiver, a satellite television receiver, a compact disc player, a digital video disc player, an MP3 player, a digital audio player, a digital video player, a digital entertainment system, or a digital device player.

The receiving unit monitors the digital transmission for the offensive material code, as seen at block 420. The offensive material code may include, for example, a predetermined code sequence or an offensive material message.

The digital transmission may be modified based on the embedded offensive material code and an offensive-material control input, as seen at block 425. A user may provide the offensive-material control input to the receiving unit. The offensive-material control input may consist of a selected button depression, a keypad input, a menu selection, a touch-screen selection, a voice-activated command, or a user preference input.

The digital transmission may be modified in one of several ways. The digital transmission may be modified by blanking a portion of the digital transmission, as seen at block 430. The portion to be blanked may be indicated by one or more offensive material codes embedded in the digital transmission. A moment of silence or a dark picture may result during the period of blanking.

The digital transmission may be modified by substituting a pre-selected insertion signal, as seen at block 435. The pre-selected insertion signal may comprise, for example, a tone, a sequence of tones, a stored audio stream, or a stored video stream. The user may choose the pre-selected insertion signal, for example, by using a pull-down menu that lists the available insertion signals.

The digital transmission may be modified by replacing an offensive segment of the digital transmission with a non-offensive segment, as seen at block 440. The non-offensive segment may be broadcast or sent with the digital transmission, and inserted where indicated by the embedded offensive material codes, as directed by the offensive-material control input.

The modified digital transmission may be played, as seen at block 445. The modified digital transmission may be played, for example, over an audio system in a mobile vehicle. Alternatively, the modified digital transmission may be played with a networked digital device, a digital radio receiver, a satellite TV receiver, a CD player, a DVD player, an MP3 player, a digital audio player, a digital video player, a digital entertainment system, or other types of digital device players.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of screening offensive material in a digital transmission, comprising:

receiving a digital transmission including at least one embedded offensive material code associated with a portion of the digital transmissiom;

monitoring the digital transmission for the offensive material code;

recognizing the offensive material code;

determining that an offensive-material control input is enabled;

determining whether the digital transmission includes an embedded non-offensive portion;

modifying the digital transmission i) using the embedded non-offensive portion when the offensive material code is detected, when the offensive-material control input is enabled and when the digital transmission includes the embedded non-offensive portion, or ii) using an other user-selected option when the offensive material code is detected, when the offensive-material control input is enabled, and when the digital transmission does not include the embedded non-offensive portion; and playing the modified digital transmission;

wherein when the digital transmission does not include the embedded non-offensive portion, the other user-selected option is a pre-selected insertion signal, and modifying includes substituting the pre-selected insertion signal for the portion of the digital transmission associated with the offensive material code; and wherein the pre-selected insertion signal is selected from the group consisting of a tone, a sequence of tones, a stored audio stream, and a stored video stream.

2. The method of claim 1 wherein the digital transmission comprises a satellite radio broadcast from one of a broadcast satellite or a terrestrial antenna.

3. The method of claim 1 wherein the digital transmission comprises a transmission selected from the group consisting of an Internet radio transmission, a digital radio transmission, a satellite television transmission, a compact disc output, a digital video disc output, an MP3 output, a digital audio transmission, a digital video transmission, and a digital device output.

4. The method of claim 1 wherein the digital transmission is received at a radio in a mobile vehicle.

5. The method of claim 1 wherein the digital transmission is received at a receiving unit selected from the group consisting of a networked digital device, a digital radio receiver, a satellite television receiver, a compact disc player, a digital video disc player, an MP3 player, a digital audio player, a digital video player, a digital entertainment system, and a digital device player.

6. The method of claim 1 wherein the offensive material code comprises a predetermined code sequence.

7. The method of claim 1 wherein the offensive material code comprises an offensive material message.

8. The method of claim 1 wherein the offensive-material control input is selected by a user via a button depression, a keypad input, a menu selection, a touch-screen selection, or a voice-activated command.

9. The method of claim 1 wherein the modified digital transmission is played over an audio system in a mobile vehicle.

10. The method of claim 1 wherein the modified digital transmission is played with a unit selected from the group consisting of a networked digital device, a digital radio receiver, a satellite television receiver, a compact disc player, a digital video disc player, an MP3 player, a digital audio player, a digital video player, a digital entertainment system, and a digital device player.

11. The method of claim 1 wherein prior to receiving, the method further comprises embedding the at least one offensive material code into the digital transmission.

12. The method of claim 1 wherein prior to receiving, the method further comprises sending the digital transmission with the at least one embedded offensive material code to a receiving unit.

13. A system for screening offensive material in a digital transmission, comprising:

means for receiving a digital transmission including at least one embedded offensive material code associated with a portion of the digital transmission;

means for monitoring the digital transmission for the offensive material code;

means for recognizing the offensive material code;

means for determining that an offensive-material control input is enabled;

means for determining whether the digital transmission includes an embedded non-offensive portion;

means for modifying the digital transmission i) using the non-offensive portion when the offensive material code is detected, when the offensive-material control input is enabled and when the digital transmission includes the embedded non-offensive portion, or ii) using an other user-selected option when the offensive material code is detected, when the offensive-material control input is enabled, and when the digital transmission does not include the embedded non-offensive portion; and means for playing the modified digital transmission;

wherein when the digital transmission does not include the embedded non-offensive portion, the other user-selected option is a pre-selected insertion signal, and the means for modifying includes means for substituting the pre-selected insertion signal for the portion of the digital transmission associated with the offensive material code, and wherein the pre-selected insertion signal is selected from the group consisting of atone, a sequence of tones, a stored audio stream, and a stored video stream.

14. The system of claim 13 further comprising means for embedding the at least one offensive material code into the digital transmission.

15. The system of claim 13 further comprising means for sending the digital transmission with the at least one embedded offensive material code to a receiving unit.

* * * * *